Aug. 28, 1951     D. J. EULER ET AL     2,565,723

BEATER

Filed Oct. 30, 1946

INVENTORS.
DONALD J. EULER
GORDON W. CRITTENDEN
JAMES B. BRANDT
BY Reynolds + Beach
ATTORNEYS Patented Aug. 28, 1951

2,565,723

UNITED STATES PATENT OFFICE 2,565,723

BEATER

Donald J. Euler and Gordon W. Crittenden, Seattle, and James B. Brandt, Bellevue, Wash., assignors to Boeing Airplane Company, a corporation of Delaware Application October 30, 1946, Serial No. 706,694

3 Claims. (Cl. 259—131)

The present invention relates to an egg beater of the hand-operated domestic type.

One of the serious disadvantages of such an egg beater, as heretofore made, is the inability of the user to maintain stable positioning of the beater elements within the bowl that contains the material being whipped. This arises from the necessity for grasping the beater by a handle located an appreciable distance above the axis of the main driving gear, and the consequent necessity for attempting to counteract the displacing force arising from rotation of the driving gear by the crank arm by resistance applied at this handle, distant several inches from the axis of rotation, which is the point of application of the displacing force. Stability of the beater can not be maintained with this relationship of resisting force to displacing force, and so the beater elements wander back and forth, or round about, within the bowl. The heavier the mixture the greater is the force required to turn the beater elements, and hence the more pronounced is this tendency to wander.

One of the primary objects of the present invention is to provide an egg beater so designed that the device may be gripped and held comfortably, close to and round about the center of rotation or the point of application of the displacing force, so that the effective leverage of such displacing force is subsantially reduced or eliminated, and the device can therefore be held, with litle effort, against wandering while it is in operation. Moreover the beater can be grasped in a manner to counteract the tendency of the crank to twist the beater as it is rotated.

A further disadvantage of conventional egg beaters, arising from a desire to keep them low in cost, is their flimsiness. Customarily, they are made largely of sheet metal. Due to the forces involved, some of which have been discussed above, parts become sprung or worn, and fail to remain in proper operative engagement. A further important object of the present invention is to make such an egg beater rugged and reliable, yet to maintain its cost at a low level, comparable favorably with the cost of those now in common use.

Previous hand-operated egg beaters, being formed largely of sheet metal, often involved assembly costs which tend to nullify the savings intended to be derived from the employment of sheet metal, and the net cost of the egg beater is increased rather than decreased by this type of construction. A further important object of the present invention is to provide an egg beater so simply constructed, and of such few separate parts, and so arranged, that all parts can be readily and permanently assembled with few operations, to the end that the net cost may be reduced by reducing the cost of assembling, even though the construction is more rugged and dependable, and might superficially be considered more expensive.

It is also an object to make an egg beater of this general type, which is of pleasing appearance, which is quiet in operation, in which all operative parts are encased against entrance of foreign matter and for protection of the user, and which requires no frame elements extending to the outer end of the beaters, to support the latter, these being adequately supported solely by their upper ends.

Still another object is to provide an egg beater of this general type, in which the beaters are so mounted that they are quickly and easily removable for cleaning, for compactness in shipping, and for storage, and preferably also one in which the hand crank arm is likewise removably secured in place, for the same purposes. Not only is the crank arm removable, but it may be connected operatively to the driving mechanism for the beaters optionally in either of two positions, in one position for use by a right-handed person, and in the other position for use by a left-handed person.

With these objects in mind, and others, particularly such as pertain to specific details of construction and arrangement, as will appear hereafter, the invention comprises the novel beater, and the novel combination and arrangement of the parts thereof, as shown in the accompanying drawings, described in the following specification, and as will be more particularly defined by the claims which terminate the same.

In the accompanying drawings the invention is embodied in a representative form, it being understood that various optional changes, particularly in design and arrangement, may be made within the scope of the invention as defined in the claims.

Figure 1:
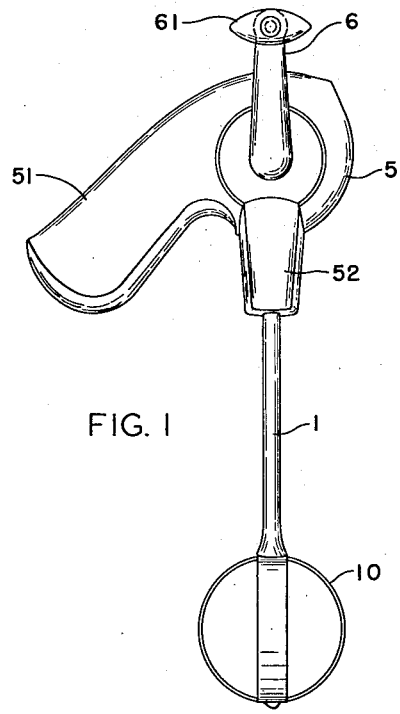
Figure 1 is an elevation of the complete beater, taken from the side.
Figure 2:
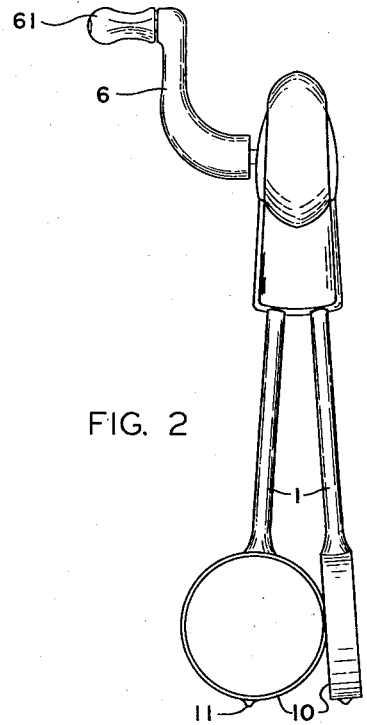
Figure 2 is a similar view taken from the front, that is, the side opposite the user.
Figure 3:
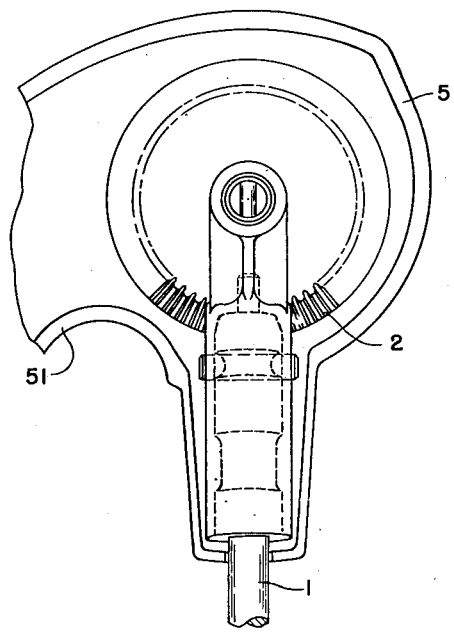
Figure 3 is an enlarged elevation, with half of the housing removed to show encased parts.
Figure 4:
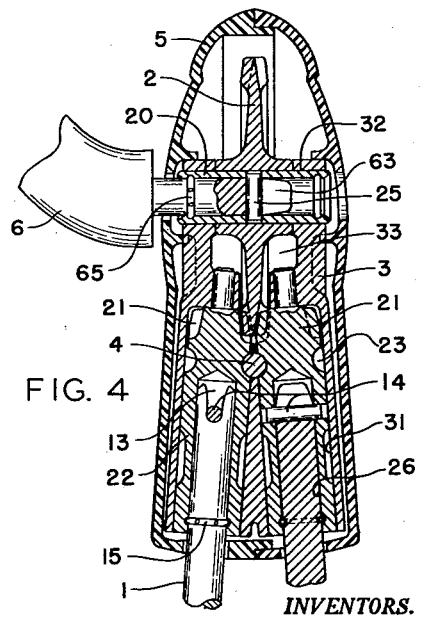
Figure 4 is a similar enlarged axial section through the drive mechanism and the mounting for the crank arm and for the beater stems.

The beater elements are shown in the form of single loops 10, carried by the lower end of generally upright stems or shanks 1. Multiple loops on each stem may be substituted for the single loop shown, if desired, and as is common practice in egg beaters. Being removably mounted, as will appear later, sets having loops of different size or number may be supplied for alternative use with mixtures of different consistency. The stems and beater elements are supported only at their upper ends, and have no support nor journal bearings at their lower ends, which, for one thing, makes cleaning very easy. A nub 11 may be formed on the loop 10 at its lower end, in alignment with the axis of the stem 1, and these, contacting the bottom of a bowl the contents of which are being whipped, will serve to support the loops substantially frictionless, and sufficiently above the bottom to permit their free rotation.

As is customary in egg beaters, there is employed, for the simultaneous rotation of the stems 1, a double-faced or double-beveled drive gear 2, and two driven pinions 21 meshing with the respectively opposite gear faces of the gear 2, and which are operatively connected to the stems 1 to rotate the latter. The connection between the pinions 21 and the beater stems is not, however, a permanent connection; that is to say, the pinions are not fixed upon the upper ends of the stems. Rather, the pinions are formed upon the upper ends of the beater drive shafts 22 which are of quite appreciable axial extent, and which are received in downwardly opening bores 31 of a frame 3. The upper ends of the stems 1 are removably received in the sockets 26 formed in the lower ends of these shafts.

The frame 3 may be conveniently and cheaply, yet accurately, die-cast. The shafts 22 and the pinions 21 thereon may also be die-cast, in which event these and the bores 31 should require little or no relative fitting. The gear 2 likewise conveniently may be die-cast.

The drive gear 2 is journaled in the upper part of the frame 3. The frame has a recess 33 for receiving this drive gear, and journal apertures 32 at opposite sides of such recess, extending transversely of the bores 31. The bores 31 converge upwardly and open into the lower portion of such recess. To mount the gear 2 and to secure it in place, it is set into the frame recess 33, and a tube 20 is fitted snugly into a journal aperture 32, pressed through the gear's hub aperture, and passed into the journal aperture on the opposite side of the recess, to form the gear's axle.

In order to secure the shafts 22 in the frame with their pinions 21 in proper mesh with the teeth of the gear 2, each pinion shaft is circumferentially grooved near its upper end, as indicated at 23, and a cross pin 4 is received in an aperture in the frame 3 at the proper location to enter the adjacent portions of the grooves 23 in both shafts. While this cross pin locks both shafts in the frame and prevents their movement axially, it does not hinder free rotation of each of these shafts.

The frame itself might be formed to constitute a handle or hand grip, or such a grip might be secured thereto. Preferably the frame 3, the gear 2, and the shafts 22 are all encased within a suitable housing 5, which may be formed in two complemental halves, cemented together, of molded plastic material. This housing 5 may be small and compact, concentrated in the vicinity of the axis of the drive gear, to fit in the palm of the hand. Preferably, however, it has formed integral with it an extension 51 in the nature of a pistol grip, which is inclined downwardly from the axis of the drive gear, at an angle convenient for grasping, when the beater stems are upright, the angle between the handle and the plane of the beater stems being approximately 45 degrees. This portion 51, with the portion 52 which extends downwardly about shafts 22, makes up a hand grip which is centered in the vicinity of the rotative axis of the gear 2.

The stems 1 may be removably received in the sockets of shafts 22, and the crank arm 6 is preferably removably joined to the gear 2. Similar connections, of conventional type, may be employed in each instance such as by notching or bifurcating the upper ends of the beater stems and one end of the crank arm, as shown at 13 and at 63, respectively, to straddle pins 14 extending transversely through the sockets of shafts 22, and pin 25 passing diametrically through the tubular axle 20 centrally between its ends. Snap rings 15 and 65, carried by the beater stems and the crank arm, respectively, engage within grooves in their respective sockets to prevent accidental disengagement of the stems 1 from the pinion shafts 22, and of the crank arm from the axle 20, respectively.

While the two beater elements are identical and interchangeable, it will be noted that the pins 14 of the two shafts 22 are disposed always perpendicular to each other, so that the beater loops 10 are always retained in this relationship while they rotate, and hence will not interfere. It will be noted also that the pin 25, with which the end of the crank 6 is removably engaged, may be engaged by inserting the bifurcated crank end 63 into either end of tube 20, which is open at both ends, and the opposite sides of housing 5 are apertured for this purpose. A groove for engaging the snap ring 65 is provided at each entrance to the axle 20.

The crank arm 6 is completed by a suitable hand or finger grip 61, which preferably is shaped for comfortable engagement by the thumb and first two fingers, and rotatably mounted upon the outer end of the crank arm.

It will be observed that the housing 5 can be grasped with the index finger of the left hand (for a right-handed user) extended around the downward extension 52, and the remaining fingers grasping the pistol grip 51. The crank arm 6 is shaped to pass over the thumb, which engages the opposite side of the housing 5. Thus grasped, the housing is well centered in the palm of the hand, and the center of resistance of the hand to torque induced by rotation of the crank arm, and tending to swing or displace the beaters 10, is substantially in coincidence with or in the close vicinity of the axis of rotation of the crank arm. Accordingly the crank's torque is resisted by all the muscles of the fingers, hand, forearm, and shoulder, in alignment, and the beaters can be held most steadily in any given position, regardless of the consistency of the material being whipped. The downward inclination of the extension 51 furthers this ease of grasping and of resisting displacement.

By making the frame 3, the gears 2, and the shafts 22 with their gears 21, as simple die castings, the cost of manufacture, finishing, and assembling is reduced to a minimum. Assembly is simplified, since it is only necessary to insert the gear 2 into the frame recess, to secure it in place by pressing in the tube 20, and then the shafts 22 may be inserted, each in its bore 31, and locked in place in mesh with the gear 2 by the insertion of the single pin 4, of wire stock. All these parts are enclosed by the housing 5, and inaccessible for tinkering by the user. Since the beaters and the crank arm are removable, so that they may be cleaned easily, there need be no occasion for dropping the beater as a whole into a dishpan. Nevertheless the encased elements thereof may be made of such material as will not be damaged, should this occur.

While the beaters have no outboard support nor bearing, the drive shafts 22 have amply long bearings in the bores 31, and the beater stems engage their shaft sockets over a considerable distance, so that the beater supporting structure is quite as rugged, or more so, than if there were outboard bearings. Consequently all the expense of manufacture and assembly of such outboard bearings, and the necessity for cleaning the same after use, is avoided.

The beater can be reduced in compass, for packaging, for shipment, or for storing away after use, by removing the beater elements from their sockets, and by removing the crank arm.

We claim as our invention:

1. A beater comprising a frame having therein a recess, two generally upright bores in its lower portion, and journal apertures at opposite sides of such recess extending transversely of such bores and thereabove, a double-faced gear received in such recess and journaled in such journal apertures, two shafts journaled one in each upright bore, and formed with pinion teeth at their upper ends meshing with the opposite sides of said gear, each of said pinion shafts being circumferentially grooved, a transverse pin secured in said frame and received within adjacent portions of both of such pinion shaft grooves to retain said pinion shafts in said frame, two stems operatively engaged one with each pinion shaft, for rotation thereby, and carrying beater elements at their lower ends, and means operatively connected to said gear to rotate the same.

2. A hand-operated beater comprising a frame having therein a recess, two generally upright bores in its lower portion, and journal apertures at opposite sides of such recess extending transversely of such bores and thereabove, a double-faced gear received in such recess, a tube mounting said gear and journaled in such journal apertures, two shafts journaled one in each upright bore, formed with pinion teeth at their upper ends meshing with the opposite sides of said gear, and having sockets in their lower ends, each of said pinion shafts being circumferentially grooved, a transverse pin secured in said frame and received within adjacent portions of both of such pinion shaft grooves to retain said pinion shafts in said frame, a housing encasing said frame, gear, and pinions, and affording a support for the beater, two stems engaged one in the socket of each pinion shaft, for rotation thereby, and carrying beater elements at their lower ends, and a crank arm engaged with said gear-mounting tube, for rotation thereof.

3. A hand operated beater comprising a frame having therein downwardly opening bores whose axes diverge downwardly at a small angle, and also having upstanding, oppositely and transversely apertured sides defining between them an opening communicating with the upper ends of said bores, an apertured horizontal drive shaft journaled in said apertured sides, a drive gear rotated by said drive shaft, and having a doublefaced toothed periphery entering each of said bores, pinion shafts mounted in said bores and in toothed engagement with the opposite faces of said drive gear, respectively, said pinion shafts having central bores therein and annular grooves in mutual registry lengthwise of the shafts, beater shafts received in said central bores and depending downwardly from said frame, and a transverse pin received commonly in said grooves and secured in said frame.

DONALD J. EULER.
GORDON W. CRITTENDEN.
JAMES B. BRANDT.

REFERENCES CITED

The following references are of record in the file of this patent:

UNITED STATES PATENTS

| Number | Name | Date |
|---|---|---|
| 1,217,832 | Saito | Feb. 27, 1917 |
| 1,761,634 | Kuck | June 3, 1930 |
| 1,971,257 | Fitzgerald | Aug. 21, 1934 |
| 2,013,887 | Jeppsson | Sept. 10, 1935 |
| 2,121,918 | Leighty | June 28, 1938 |

FOREIGN PATENTS

| Number | Country | Date |
|---|---|---|
| 75,347 | Sweden | July 15, 1930 |
| 510,971 | Great Britain | Aug. 11, 1939 |